(12) United States Patent
Smutny et al.

(10) Patent No.: US 9,379,530 B2
(45) Date of Patent: Jun. 28, 2016

(54) GROMMET WITH SPREADER MOUNTING FEATURE

(71) Applicant: DELPHI TECHNOLOGIES, INC., Troy, MI (US)

(72) Inventors: Dale J. Smutny, Canfield, OH (US); John W. Shaffer, Bristolville, OH (US)

(73) Assignee: Delphi Technologies, Inc., Troy, MI (US)

( * ) Notice: Subject to any disclaimer, the term of this patent is extended or adjusted under 35 U.S.C. 154(b) by 132 days.

(21) Appl. No.: 14/097,553

(22) Filed: Dec. 5, 2013

(65) Prior Publication Data

US 2015/0162733 A1 Jun. 11, 2015

(51) Int. Cl.
*H02G 3/22* (2006.01)

(52) U.S. Cl.
CPC ........................................ *H02G 3/22* (2013.01)

(58) Field of Classification Search
CPC ........................................................ H02G 3/22
USPC ............................. 174/152 G, 153 G; 248/56
See application file for complete search history.

(56) References Cited

U.S. PATENT DOCUMENTS

| 3,919,460 | A | * | 11/1975 | Neail et al. ...................... 174/87 |
| 4,377,291 | A | * | 3/1983 | Albertini ........................ 277/619 |
| 4,607,469 | A | * | 8/1986 | Harrison ....................... 52/220.8 |
| 4,656,689 | A | * | 4/1987 | Dennis .................... F16L 5/027 16/2.2 |
| 5,531,459 | A | * | 7/1996 | Fukuda et al. ................. 277/606 |
| 5,739,475 | A | * | 4/1998 | Fujisawa et al. .......... 174/153 G |
| 6,225,562 | B1 | * | 5/2001 | Fujishita et al. ................. 174/76 |
| 8,584,315 | B1 | * | 11/2013 | Adachi et al. ..................... 16/2.1 |
| 2014/0054064 | A1 | * | 2/2014 | Gronowicz, Jr. ..... B60R 16/0222 174/152 G |

* cited by examiner

*Primary Examiner* — William H Mayo, III
*Assistant Examiner* — Hiram E Gonzalez
(74) *Attorney, Agent, or Firm* — Robert J. Myers

(57) ABSTRACT

A flexible grommet with a grommet spreader mounting and alignment feature is provided. The grommet is configured to attach an object to a support structure. A body of the grommet defines an opening configured to clamp around the object. The opening defines a plurality of channels configured to facilitate mounting of the grommet onto the spreader. The channels may also be configured to correctly orient a mating feature of the grommet relative to the spreader.

4 Claims, 2 Drawing Sheets

GROMMET WITH SPREADER MOUNTING FEATURE

TECHNICAL FIELD OF INVENTION

This disclosure generally relates to a flexible grommet configured to attach an object to a support structure, and more particularly to a flexible grommet with a mounting feature that facilitates mounting of the grommet onto a spreader tool used for assembling the grommet to the object.

BACKGROUND OF INVENTION

It is known to use flexible grommets to attach an object such as a wire harness to a support structure such as a body panel of a vehicle. Typically, a circular opening passing through the grommet clamps around the object, and an exterior mating feature of the grommet engages a mounting feature (e.g. slot or hole) of the support structure to secure the grommet and object to the support structure. The grommet may be positioned in a specified orientation relative to the object such that the object is correctly oriented relative to the support structure when the mating feature of the grommet is engaged with the mounting feature of the support structure.

Typically, to assemble the grommet around the object, a tool commonly called a grommet spreader or simply a spreader is utilized to stretch open the circular opening of the grommet to allow the object to be passed through. Once the object has been passed through and is in the correct position, the grommet is pulled off of the spreader to allow the grommet to clamp into position around the object.

One shortcoming associated with the usage of known grommet designs is the difficulty in stretching the circular opening over the outermost edges of the spreader. Another shortcoming is the difficulty in correctly aligning the grommet to the spreader as a result of the circular shape of the circular opening.

SUMMARY OF THE INVENTION

In accordance with one embodiment, a flexible grommet configured to attach an object to a support structure is provided. The flexible grommet includes a body that defines an opening configured to clamp around the object. The opening defines a plurality of channels configured to facilitate mounting of the grommet onto a spreader.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
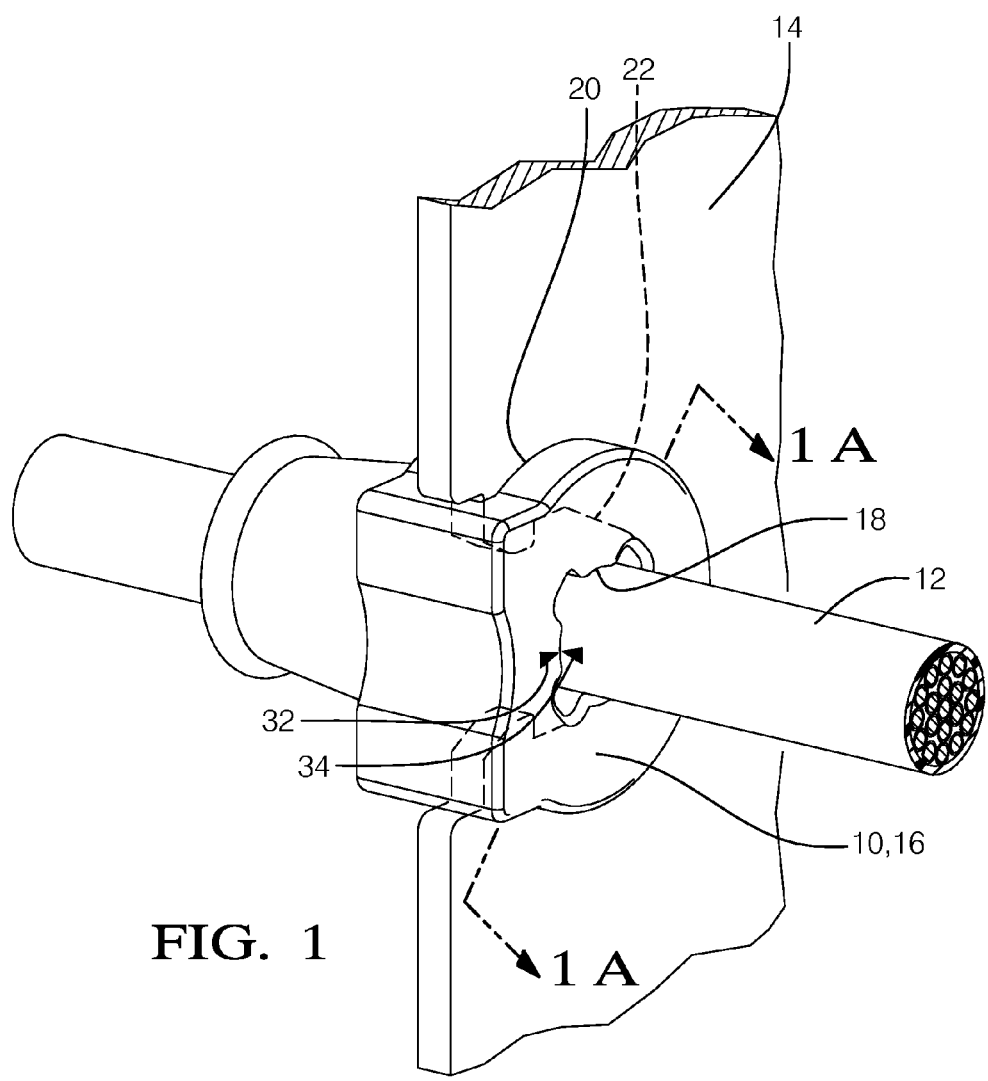
FIG. 1 is a perspective view of an object attached to a support structure with a grommet in accordance with one embodiment.

FIG. 1 illustrates a non-limiting example of a flexible grommet 10 that is configured to attach an object 12 to a support structure 14. The object 12 may be a wire harness for a vehicle (not shown), and the support structure 14 may be a panel of the vehicle. A body 16 of the grommet 10 defines an opening 18 that is configured to clamp around the object 12 to hold the object 12 to the grommet 10. The body 16 further defines a mating feature 20 that is configured to engage a mounting feature 22 of the support structure 14 to secure the grommet 10 to the support structure 14. In the example shown, an exterior portion (i.e. mating feature 20) of the body 16 engages a slot (i.e. mounting feature 22) in the support structure 14 to secure the grommet 10 to the support structure 14.

Figure 1A:
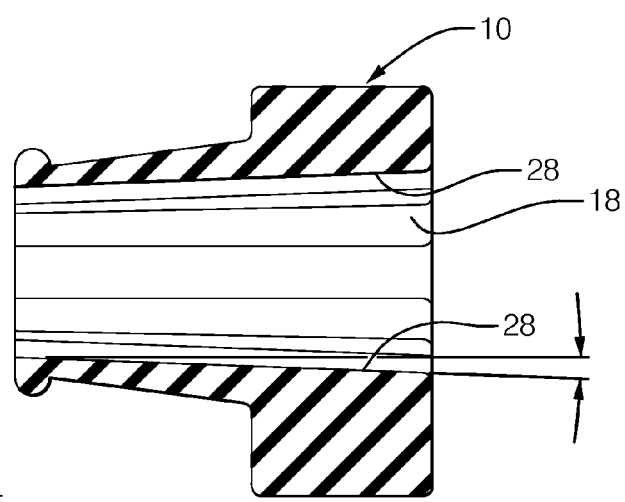
FIG. 1A is a sectional view of the grommet.
Figure 2:
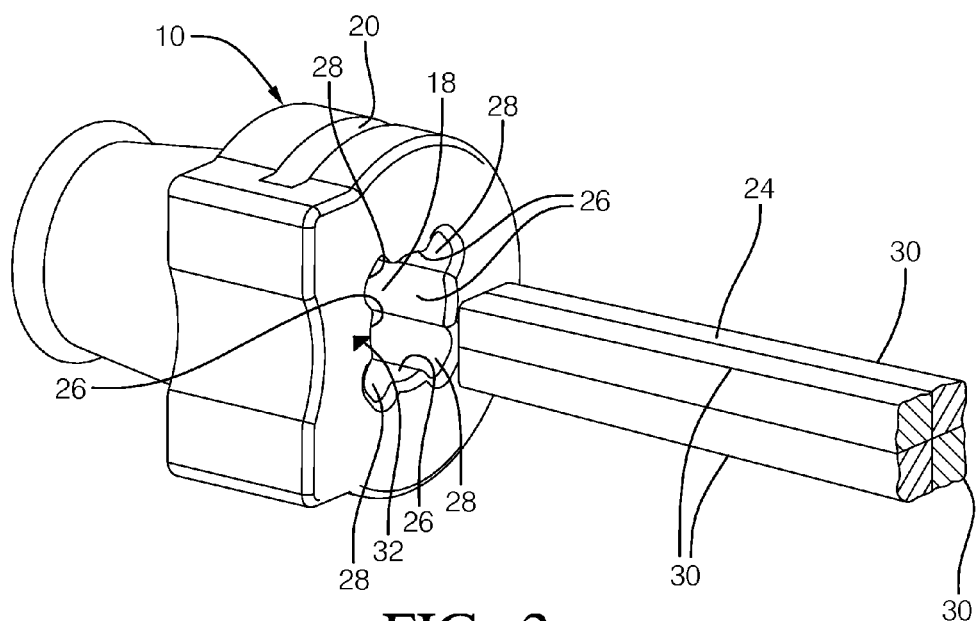
FIG. 2 is a perspective view of the grommet in a relaxed state and prior to being mounted onto a grommet spreader in accordance with one embodiment.

FIG. 2 illustrates the grommet 10 in a relaxed state (i.e. not assembled onto the object 12) and prior to being mounted onto a grommet spreader 24. The opening 18 of the grommet 10 defines a circular portion 26 that is sized to clamp around the object 12. The opening 18 also defines a plurality of channels 28 that are configured to facilitate mounting of the grommet 10 onto the spreader 24. In the example shown, the channels 28 are recessed from the circular portion 26 and are positioned in accordance with a plurality of outermost edges 30 of the spreader 24 such that the outermost edges 30 do not load against the circular portion 26 when the grommet 10 is mounted onto the spreader 24. This results in less effort or force being required to mount the grommet 10 onto the spreader 24 and a lower likelihood of grommet damage due to a lower peak stress on the grommet 10 when the grommet 10 is stretched open. The channels 28 may also be tapered in accordance with the outermost edges 30, as shown in FIG. 1A, to further facilitate the mounting of the grommet onto the spreader 24 and facilitate the dismounting of the grommet 10 from the spreader 24.

Figure 3:
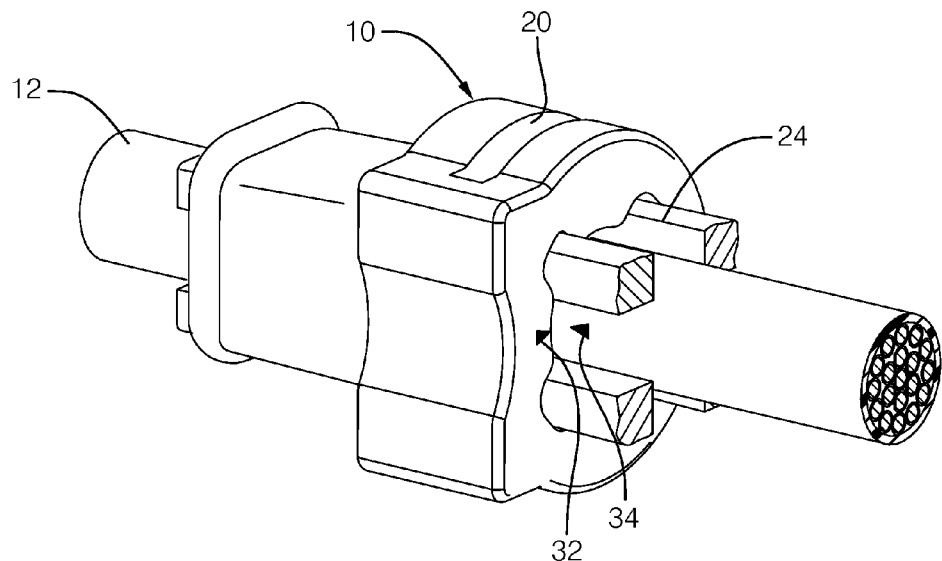
FIG. 3 is a perspective view of the grommet being stretched open by the grommet spreader to allow the object to be passed through the grommet in accordance with one embodiment.

The channels 28 of the opening 18 may further be configured to correctly orient the mating feature 20 relative to the spreader 24 such that the mating feature 20 is correctly oriented relative to the object 12 when the object 12 is passed through the spreader 24 during assembly, as shown in FIG. 3 and as indicated by a grommet marking 32 being aligned with an object marking 34. In the example shown, the channels 28 are oriented relative to the mating feature 20 such that the mating feature 20 is correctly oriented relative to the spreader 24 when the channels 28 are aligned with the outermost edges 30.

The grommet 10 may be made of known material such as Ethylene Propylene Diene Monomer (EPDM) rubber.

Accordingly, a grommet 10 with a spreader mounting feature is provided. The grommet 10 provides for easier mounting and alignment to a spreader 24 when compared to the prior art. The grommet 10 also reduces the likelihood of grommet damage as a result of a lower peak stress on the grommet 10 when the grommet 10 is stretched open.

While this invention has been described in terms of the preferred embodiments thereof, it is not intended to be so limited, but rather only to the extent set forth in the claims that follow.

We claim:

1. A flexible grommet configured to attach a wire harness to a support structure, said grommet comprising:
    a flexible body that defines a circular opening configured to clamp around the wire harness, wherein the opening defines a plurality of longitudinal channels evenly spaced about the opening and recessed into the surface of the circular opening and wherein the plurality of longitudinal channels are configured to receive at least two elongated spreaders configured to stretch the circular opening during insertion of the wire harness into the circular opening.

2. The grommet of claim 1, wherein the longitudinal channels are longitudinally tapered.

3. The grommet of claim 1, wherein a mating feature on an exterior portion of the body engages a slot in the support structure to secure the grommet to the support structure.

4. The grommet of claim 3, wherein the plurality of longitudinal channels are further configured to orient the mating feature relative to the spreader such that a grommet marking on the grommet is aligned with an object marking on the object when the object is passed through the spreader during assembly.

* * * * *